US008452518B2

(12) United States Patent
Barasa (10) Patent No.: US 8,452,518 B2
(45) Date of Patent: May 28, 2013

(54) POST-COMBUSTION FUEL INJECTION CONTROL SYSTEMS AND METHODS (75) Inventor: Patrick Barasa, Ann Arbor, MI (US)

(73) Assignee: GM Global Technology Operations LLC (*) Notice: Subject to any disclaimer, the term of this patent is extended or adjusted under 35 U.S.C. 154(b) by 458 days.

(21) Appl. No.: 12/769,185

(22) Filed: Apr. 28, 2010

(65) Prior Publication Data
US 2011/0265450 A1 Nov. 3, 2011

(51) Int. Cl.
G06F 19/00 (2011.01)
F01N 3/20 (2006.01)
F01N 3/025 (2006.01)

(52) U.S. Cl.
USPC .............. 701/102; 60/286; 60/295; 60/303; 60/311

(58) Field of Classification Search
USPC ............. 701/101–103, 114; 60/274, 276, 60/277, 284–286, 295, 297, 299, 301, 303, 60/311
See application file for complete search history.

(56) References Cited

U.S. PATENT DOCUMENTS

| 5,207,058 | A * | 5/1993 | Sasaki et al. ............ 60/286 |
| 6,389,805 | B1 | 5/2002 | Poggio et al. |
| 6,449,945 | B1 | 9/2002 | van Nieuwstadt |
| 7,337,607 | B2 * | 3/2008 | Hou et al. .............. 60/286 |
| 7,628,010 | B2 * | 12/2009 | Kurata et al. ........... 60/286 |
| 8,006,486 | B2 * | 8/2011 | Torisaka ................. 60/286 |
| 2004/0144082 | A1 | 7/2004 | Mianzo et al. |
| 2004/0182068 | A1 | 9/2004 | Sun et al. |
| 2007/0056264 | A1 | 3/2007 | Hou et al. |
| 2011/0107750 | A1 * | 5/2011 | Kowada et al. .......... 60/299 |
| 2011/0265458 | A1 * | 11/2011 | Barasa ................... 60/286 |
| 2011/0270504 | A1 * | 11/2011 | Barasa ................... 701/101 |
| 2012/0060478 | A1 | 3/2012 | Vernassa et al. |

FOREIGN PATENT DOCUMENTS

| DE | 19907382 A1 | 8/2000 |
| DE | 102004030199 (A1) | 1/2006 |
| DE | 602005004815 T2 | 2/2009 |
| EP | 1698776 A1 | 9/2006 |
| FR | 2910928 A1 * | 7/2008 |
| JP | 2007092614 A * | 4/2007 |
| WO | WO2009/016266 A2 | 2/2009 |

OTHER PUBLICATIONS

U.S. Appl. No. 12/769,142, filed Apr. 28, 2010, Patrick Barasa.

(Continued)

Primary Examiner — Willis R Wolfe, Jr.

(57) ABSTRACT

An exhaust control system comprises a total loss determination module and a fuel control module. The total loss determination module determines a total energy loss rate of exhaust upstream of a location in an exhaust system based on a convective energy loss rate upstream of the location, a conductive energy loss rate upstream of the location, and an oxidation energy gain rate upstream of the location. The fuel control module receives a target temperature for the exhaust at the location and determines a target input energy rate based on the target temperature, a temperature of exhaust input to the exhaust system, and the total energy loss rate. The fuel control module controls a rate of fuel injection into the exhaust system upstream of an oxidation catalyst based on the target input energy rate.

20 Claims, 6 Drawing Sheets

OTHER PUBLICATIONS

U.S. Appl. No. 12/769,202, filed Apr. 28, 2010, Patrick Barasa.
Bosch Kraftfahrtechnisches Taschenbuch. 25. Auflage. Wisbaden: Friedr. Vieweg & Sohn Verlag/GWV Fachverlage GmbH, Oct. 2003. 66, 67, 133.—ISBN 3-528-23876-3.

Office Action dated Sep. 5, 2012 from the German Patent Office for German Patent Application No. 10 2011 018 453.8, 8 pages.
Office Action dated Nov. 27, 2012 from the German Patent Office for German Patent Application No. 10 2011 018 451.1; 7 pages.

* cited by examiner

POST-COMBUSTION FUEL INJECTION CONTROL SYSTEMS AND METHODS

CROSS-REFERENCE TO RELATED APPLICATIONS

This application is related to U.S. patent application Ser. Nos. 12/769,142 filed on Apr. 28, 2010, and 12/769,202 filed on Apr. 28, 2010. The disclosures of the above applications are incorporated herein by reference in their entirety.

FIELD

The present disclosure relates to internal combustion engine systems and more particularly to exhaust systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel to produce drive torque for a vehicle. Air is drawn into the engine through a throttle valve. Fuel provided by one or more fuel injectors mixes with the air to form the air/fuel mixture. The air/fuel mixture is combusted within one or more cylinders of the engine. An engine control module (ECM) controls the torque output of the engine.

Exhaust resulting from combustion of the air/fuel mixture is expelled from the engine to an exhaust system. The ECM may adjust one or more engine parameters based on signals from sensors that measure parameters within the exhaust system, respectively. For example only, one or more temperature sensors, exhaust flow rate sensors, oxygen sensors, and/or other suitable sensors may be implemented within the exhaust system.

Measurements from the sensors may enable the ECM to adjust one or more engine parameters to adjust one or more of the measured parameters toward desired parameters, respectively. As the number of sensors implemented in a vehicle increases, however, the cost of producing the vehicle also increases. The increased cost may be attributable to the sensors themselves, associated wiring and hardware, and research and development. Additionally, a vehicle producer may produce a number of different vehicles, and each of the different vehicles may have a different exhaust system configuration. Calibrating and adjusting sensors implemented for each different vehicle and exhaust system may also increase the production cost of a vehicle.

SUMMARY

An exhaust control system comprises a total loss determination module and a fuel control module. The total loss determination module determines a total energy loss rate of exhaust upstream of a location in an exhaust system based on a convective energy loss rate upstream of the location, a conductive energy loss rate upstream of the location, and an oxidation energy gain rate upstream of the location. The fuel control module receives a target temperature for the exhaust at the location and determines a target input energy rate based on the target temperature, a temperature of exhaust input to the exhaust system, and the total energy loss rate. The fuel control module controls a rate of fuel injection into the exhaust system upstream of an oxidation catalyst based on the target input energy rate.

An exhaust control method comprises: determining a total energy loss rate of exhaust upstream of a location in an exhaust system based on a convective energy loss rate upstream of the location, a conductive energy loss rate upstream of the location, and an oxidation energy gain rate upstream of the location; receiving a target temperature for the exhaust at the location; determining a target input energy rate based on the target temperature, a temperature of exhaust input to the exhaust system, and the total energy loss rate; and controlling a rate of fuel injection into the exhaust system upstream of an oxidation catalyst based on the target input energy rate.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An internal combustion engine generates drive torque through combustion of an air/fuel mixture. Exhaust resulting from combustion of the air/fuel mixture is expelled from the engine to an exhaust system. The exhaust flows through components of the exhaust system before being expelled from the exhaust system. The exhaust system may treat the exhaust to reduce the amounts of one or more exhaust constituents before the exhaust is expelled from the exhaust system.

An exhaust control module estimates a rate at which energy is input to a given one of the components of the exhaust system. The exhaust may gain and lose energy while flowing from an input to an output of the component. For example only, the exhaust may lose energy via convection. The exhaust may also lose energy via conduction. The exhaust may gain energy via oxidation of hydrocarbons of the exhaust.

The exhaust control module estimates a convective energy loss rate, a conductive energy loss rate, and an oxidation energy gain rate associated with the component. The exhaust control module also estimates an energy output rate for the component based on the energy input rate, the convective and conductive energy loss rates, and the oxidation energy gain rate. The exhaust control module estimates a temperature of the exhaust output from the component based on the energy output rate. Estimating the temperatures of the exhaust at various locations in the exhaust system may reduce the production cost of a vehicle as one or more temperature sensors may be omitted.

The exhaust control module may receive a target temperature for the exhaust at a location within the exhaust system. The exhaust control module estimates a total energy loss rate upstream of the location based on convective energy losses sustained upstream of the location, conductive energy losses sustained upstream of the location, and oxidation energy gains achieved upstream of the location.

The exhaust control module estimates a target input energy rate to adjust the temperature of the exhaust at the location toward the target temperature. The exhaust control module estimates the target input energy rate based on the total energy loss rate, the target temperature, and a temperature of the exhaust input to the exhaust system. The exhaust control module controls the rate of fuel injection upstream of an oxidation catalyst based on the target input energy rate. In this manner, the exhaust control module controls the fuel injection rate to adjust the temperature of the exhaust at the location toward the target temperature.

Figure 1:
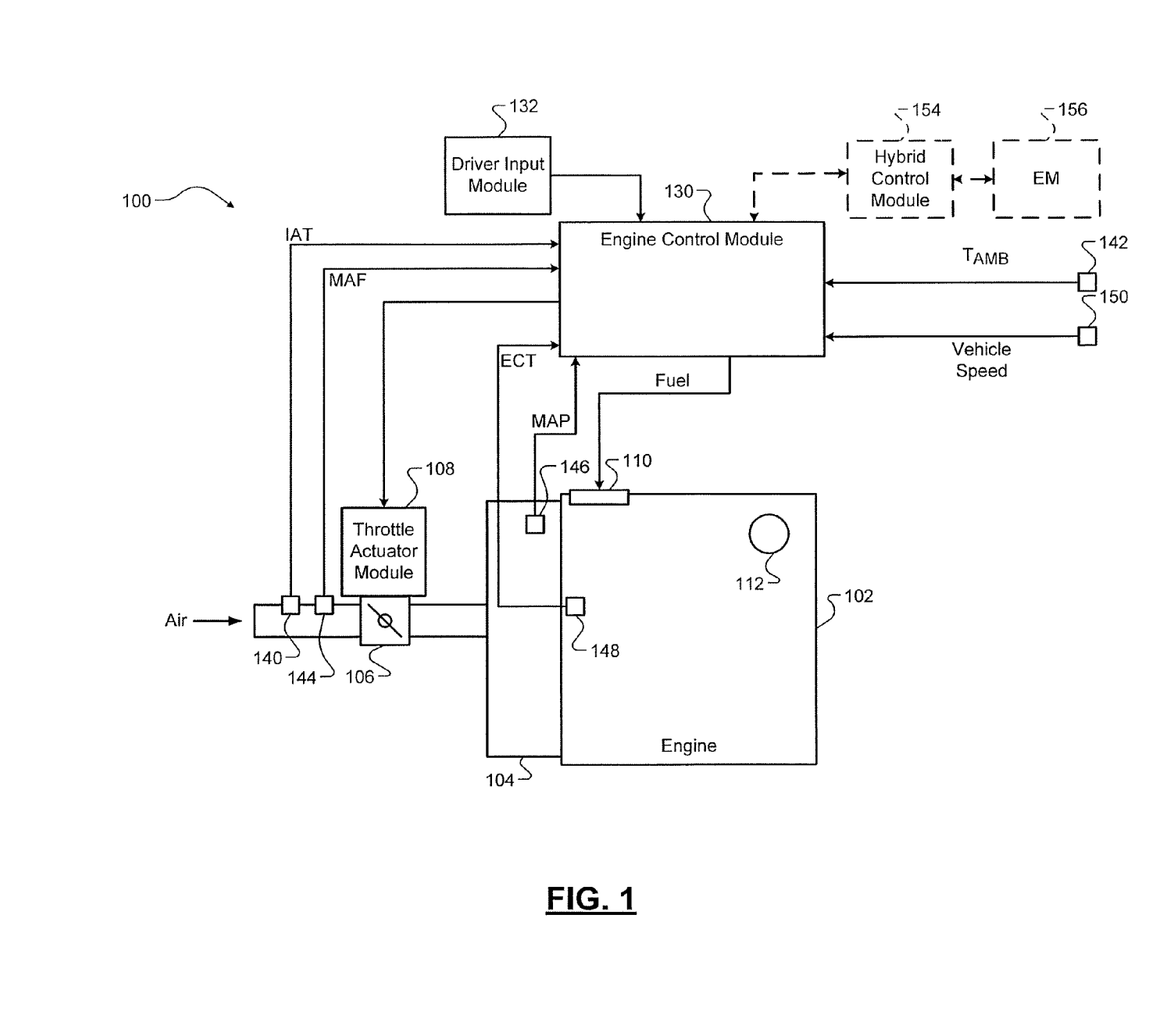
FIG. 1 is a functional block diagram of an exemplary engine system according to the principles of the present disclosure.

Referring now to FIG. 1, a functional block diagram of an exemplary implementation of an engine system 100 is presented. An air/fuel mixture is combusted within an engine 102 to produce drive torque for a vehicle. While the engine 102 will be discussed as a diesel-type engine, the present disclosure is applicable to other types of engines, such as gasoline-type engines and other suitable types of engines.

Air is drawn into the engine 102 through an intake manifold 104 and a throttle valve 106. The throttle valve 106 is actuated to control the flow of air into the engine 102. A throttle actuator module 108 controls a flowrate of air through the throttle valve 106. For example only, the throttle actuator module 108 may control opening of the throttle valve 106.

A fuel actuator module 110 injects fuel that mixes with the air to form the air/fuel mixture. The fuel actuator module 110 may inject the fuel, for example, into the intake manifold 104, near one or more intake valves (not shown) associated a cylinder 112 of the engine 102, directly into the cylinder 112, or at another suitable location. For example only, the fuel actuator module 110 may include one fuel injector (not shown) for each cylinder of the engine 102.

While only the single cylinder 112 is shown, the engine 102 may include more than one cylinder. The cylinders may be arranged in one or more banks of cylinders. The air/fuel mixture is combusted within the cylinders of the engine 102. Combustion of the air/fuel mixture generates drive torque and rotatably drives a crankshaft (not shown).

An engine control module (ECM) 130 controls the torque output of the engine 102. The ECM 130 may control the torque output of the engine 102 based on driver inputs provided by a driver input module 132. The driver input module 132 may generate the driver inputs based on an accelerator pedal position, a brake pedal position, cruise control inputs, and other suitable driver inputs.

The ECM 130 may control various engine actuators and various engine parameters to control the torque output of the engine 102. For example only, the ECM 130 may control opening of the throttle valve 106, rate of fuel injection, cylinder deactivation (e.g., number of cylinders deactivated), turbocharger boost, opening/closing of intake and exhaust valves, and/or other engine parameters.

The ECM 130 may communicate with one or more modules or systems of a vehicle. For example only, the ECM 130 may communicate with a hybrid control module 154 to coordinate operation of the engine 102 and one or more electric motors, such as electric motor (EM) 156. The EM 156 may also function as a generator and may be used to selectively produce electrical energy for use by vehicle electrical systems and/or for storage in an energy storage device (not shown).

The ECM 130 selectively makes control decisions based on parameters measured by various sensors. For example, intake air temperature may be measured using an intake air temperature (IAT) sensor 140. Ambient air temperature ($T_{AMB}$) may be measured using an ambient temperature sensor 142. The mass flowrate of air through the throttle valve 106 may be measured using a mass air flowrate (MAF) sensor 144.

A pressure within the intake manifold 104 may be measured using a manifold absolute pressure (MAP) sensor 146. In various implementations, engine vacuum may be measured, where the engine vacuum is determined based on a difference between ambient air pressure and the pressure within the intake manifold 104.

An engine coolant temperature (ECT) may be measured using an ECT sensor 148. The ECT sensor 148 may be located within the engine 102 or at another location where engine coolant is circulated, such as in a radiator (not shown). A vehicle speed sensor 150 measures a vehicle speed. The vehicle speed sensor 150 may measure the vehicle speed based on a transmission output shaft speed, a wheel speed, or another suitable measure of the vehicle speed.

Figure 2:
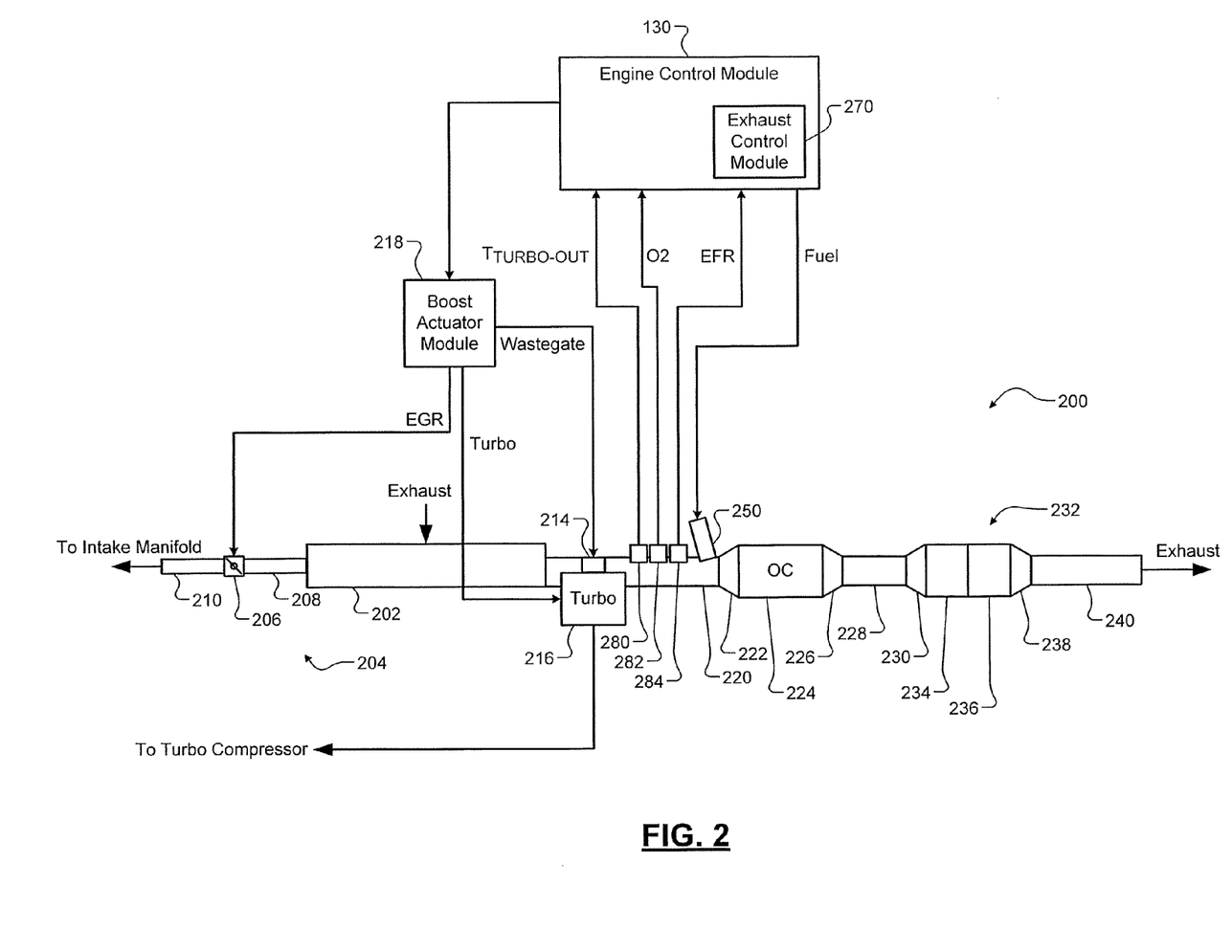
FIG. 2 is a functional block diagram of an exemplary exhaust system according to the principles of the present disclosure.

Referring now to FIG. 2, a functional block diagram of an exemplary exhaust system 200 that is associated with the engine 102 is presented. While the exhaust system 200 will be described as it is configured in FIG. 2, the present disclosure is applicable to other exhaust system configurations which may include a fewer or greater number of components.

Exhaust resulting from combustion of the air/fuel mixture is expelled from the engine 102 to an exhaust manifold 202. An exhaust recirculation (EGR) system 204 may be implemented to selectively direct exhaust back to the intake manifold 104. The EGR system 204 may include an EGR valve 206, a first EGR pipe 208, and a second EGR pipe 210. The EGR valve 206 receives exhaust from the exhaust manifold 202 via the first EGR pipe 208. The EGR valve 206 selectively directs exhaust from the exhaust manifold 202 back to the intake manifold 104 via the second EGR pipe 210.

Exhaust not directed by the EGR system 204 may flow from the exhaust manifold 202 to a turbocharger 216. The turbocharger 216 provides pressurized air to the intake manifold 104. More specifically, the turbocharger 216 includes a compressor (not shown in FIG. 1) that draws in air, pressurizes the air, and provide the pressurized air to the intake manifold 104.

The turbocharger compressor may compress air drawn from the intake manifold 104, from the environment, and/or from another suitable air source. The turbocharger compressor is powered by the exhaust. More specifically, an impeller (not shown) of the turbocharger 216 is rotatably driven by the exhaust, and the impeller rotatably drives the compressor. The turbocharger 216 may include variable geometry technology, variable vane technology, variable nozzle technology, and/or other suitable technology. The turbocharger 216 may include another turbocharger (e.g., a dual-turbocharger) and/or one or more additional turbochargers may be included in the exhaust system 200.

A wastegate 214 may be selectively opened to allow exhaust to bypass the turbocharger 216. In this manner, the wastegate 214 may be used to control the output (i.e., boost) of the turbocharger 216. The ECM 130 may control the output of the turbocharger 216 via a boost actuator module 218. For example only, the boost actuator module 218 may control the output of the turbocharger 216 by controlling the wastegate 214, the extent to which the turbocharger 216 is in the path of the exhaust, and/or other suitable parameters. The boost actuator module 218 may also control opening of the EGR valve 206. The boost actuator module 218 may control the turbocharger 216, the wastegate 214, and/or the EGR valve 206 based on one or more signals from the ECM 130.

The exhaust may flow from the turbocharger 216 to a first exhaust pipe 220. The exhaust may flow through the first exhaust pipe 220 to a first conical frustum 222. The first conical frustum 222 may receive the exhaust at a top of the first conical frustum 222, and the exhaust may flow toward a base of the first conical frustum 222. The first conical frustum 222 may include an increasing opening from the first exhaust pipe 220 to a first catalyst 224.

The first catalyst 224 includes an oxidation catalyst (OC). While other types of OCs may be included, the first catalyst 224 will be discussed as including a diesel oxidation catalyst (DOC). The DOC 224 may be implemented within a housing that may be similar to the first exhaust pipe 220. The exhaust may flow through the DOC 224 to a second conical frustum 226.

The second conical frustum 226 may receive the exhaust at a base of the second conical frustum 226, and the exhaust may flow toward a top of the second conical frustum 226. The second conical frustum 226 may include a decreasing opening from the DOC 224 to a second exhaust pipe 228.

The exhaust may flow through the second exhaust pipe 228 to a third conical frustum 230. The third conical frustum 230 may receive the exhaust at a top of the third conical frustum 230, and the exhaust may flow toward a base of the third conical frustum 230. The third conical frustum 230 may include an increasing opening from the second exhaust pipe 228 to a catalyst/filter unit 232.

The catalyst/filter unit 232 may include a catalyst 234 and a particulate filter 236. While other types of catalysts and particulate filters may be included, the catalyst 234 will be discussed as including a selective catalytic reduction (SCR) catalyst, and the filter 236 will be discussed as including a diesel particulate filter (DPF). The SCR catalyst 234 and the DPF 236 may be implemented together within one housing as shown in FIG. 2, or the SCR catalyst 234 and the DPF 236 may be implemented within individual housings.

The exhaust may flow from the catalyst/filter unit 232, through a fourth conical frustum 238, to a third exhaust pipe 240. The fourth conical frustum 238 may receive the exhaust at a base of the fourth conical frustum 238, and the exhaust may flow toward a top of the fourth conical frustum 238. The fourth conical frustum 238 may include a decreasing opening from the catalyst/filter unit 232 to the third exhaust pipe 240. The exhaust system 200 may also include one or more additional components not shown in FIG. 2.

The exhaust system 200 may include a fuel actuator module 250 that injects fuel or another hydrocarbon providing fluid into the exhaust system 200 at a location upstream of the DOC 224. The fuel actuator module 250 may include one or more fuel injectors. Fuel injected into the exhaust system 200 may vaporize. For example only, heat from the exhaust may cause injected fuel to vaporize. The DOC 224 oxidizes hydrocarbons, and the oxidation produces heat. The heat generated by hydrocarbon oxidation is directed downstream of the DOC 224 by the flow of the exhaust.

A dosing agent actuator module (not shown) may also be included that injects a dosing agent (e.g., urea) into the exhaust system 200. The dosing agent actuator module may inject the dosing agent at a location between the DOC 224 and the SCR catalyst 234. The SCR catalyst 234 may selectively absorb ammonia ($NH_3$) provided by the dosing agent, and the ammonia may react with nitrogen oxides (NOx) passing through the SCR catalyst 234.

A percentage of the NOx of the exhaust that is removed from the exhaust via reaction with ammonia may be referred to as the NOx conversion efficiency. The NOx conversion efficiency may be related to a storage capacity of the SCR catalyst 234, and the storage capacity may be inversely related to a temperature of the SCR catalyst 234. A percentage of the HC converted (e.g., oxidized) by the DOC 224 may be referred to as the HC conversion efficiency. The HC conversion efficiency may be related to exhaust temperature.

The DPF 236 may filter particulate from the exhaust passing through the DPF 236. Particulate filtered from the exhaust may accumulate within the DPF 236 over time. Particulate trapped within the DPF 236 may be removed from the DPF 236 through a process that may be referred to as regeneration.

Regeneration of the DPF 236 may involve clearing of trapped particulate from the DPF 236. Particulate may burn at temperatures greater than a predetermined temperature (e.g., approximately 600-800° C.). Heat generated via hydrocarbon oxidation upstream of the DPF 236 (e.g., by the DOC 224) may be used to create the temperature conditions for regeneration.

The ECM 130 may include an exhaust control module 270 that controls the injection of fuel into the exhaust system 200. For example only, the exhaust control module 270 may control a mass flowrate (e.g., g/s) at which the fuel is injected into the exhaust system 200 by the fuel actuator module 250. Fuel injected into the exhaust system 200 may be referred to as post-combustion fuel as it is injected downstream of the engine 102.

The exhaust control module 270 and/or the ECM 130 may make control decisions based on signals from one or more sensors. The exhaust system 200 may include a turbo outlet temperature sensor 280, an oxygen sensor 282, and an exhaust flow rate (EFR) sensor 284. The turbo outlet temperature sensor 280 measures a temperature of the exhaust output from the turbocharger 216 and generates a turbo outlet temperature signal ($T_{TURBO-OUT}$) accordingly. In other words, the turbo outlet temperature sensor 280 measures temperature of the exhaust input to the first exhaust pipe 220.

The oxygen sensor 282 measures oxygen concentration of the exhaust input to the first exhaust pipe 220 and generates an O2 signal based on the oxygen concentration. In other implementations, a lambda sensor (not shown) may be implemented, and the oxygen sensor 282 may be omitted. The EFR sensor 284 measures a mass flowrate of the exhaust input to the first exhaust pipe 220 and generates an EFR signal accordingly.

While the exhaust control module 270 is shown and discussed as being located within the ECM 130, the exhaust control module 270 may be located in another suitable location, such as external to the ECM 130. The exhaust control module 270 determines a rate of energy input to a given component. The exhaust control module 270 also estimates an energy loss rate attributable to conduction and an energy loss rate attributable to via convection. The exhaust control module 270 may also estimate an energy gain rate attributable to hydrocarbon oxidation for the component.

The exhaust control module 270 estimates a net energy output rate from the given component based on the rate of energy input to the component, the convective energy loss rate, the conductive energy loss rate, and the oxidation energy gain rate. The exhaust control module 270 estimates a temperature of the exhaust output from the component based on the net rate of energy output from the component.

The exhaust control module 270 may use the temperature and the net energy output rate the component as the temperature and input energy rate of a next component. The exhaust control module 270 may estimate a convective energy loss rate, a conductive energy loss rate, an oxidation energy gain rate, a net output energy rate, and an outlet temperature for the next component, and so on.

The exhaust control module 270 may additionally or alternatively estimate a net energy of exhaust at a desired location between an inlet and an outlet of a component, such as within the DPF 236. The exhaust control module 270 may estimate the net energy at the desired location based on the energy input rate of the component, a convective loss rate between the inlet and the desired location, a conductive loss rate between the inlet and the desired location, and an oxidation gain rate between the inlet and the desired location. The exhaust control module 270 may estimate a temperature of the exhaust at the desired location based on the net energy at the desired location. The exhaust control module 270 may control one or more parameters based on one or more of the temperatures.

The exhaust control module 270 of the present disclosure may receive a target temperature for the exhaust at a location within the exhaust system. The exhaust control module 270 estimates a target input energy rate to adjust the temperature of the exhaust at the location toward the target temperature. The exhaust control module 270 estimates the target input energy rate based on the total energy loss rate, the target temperature, and a temperature of the exhaust input to the exhaust system. The exhaust control module 270 controls the rate of fuel injection upstream of an oxidation catalyst based on the target input energy rate. In this manner, the exhaust control module 270 controls the fuel injection rate to adjust the temperature of the exhaust at the location toward the target temperature.

Figure 3:
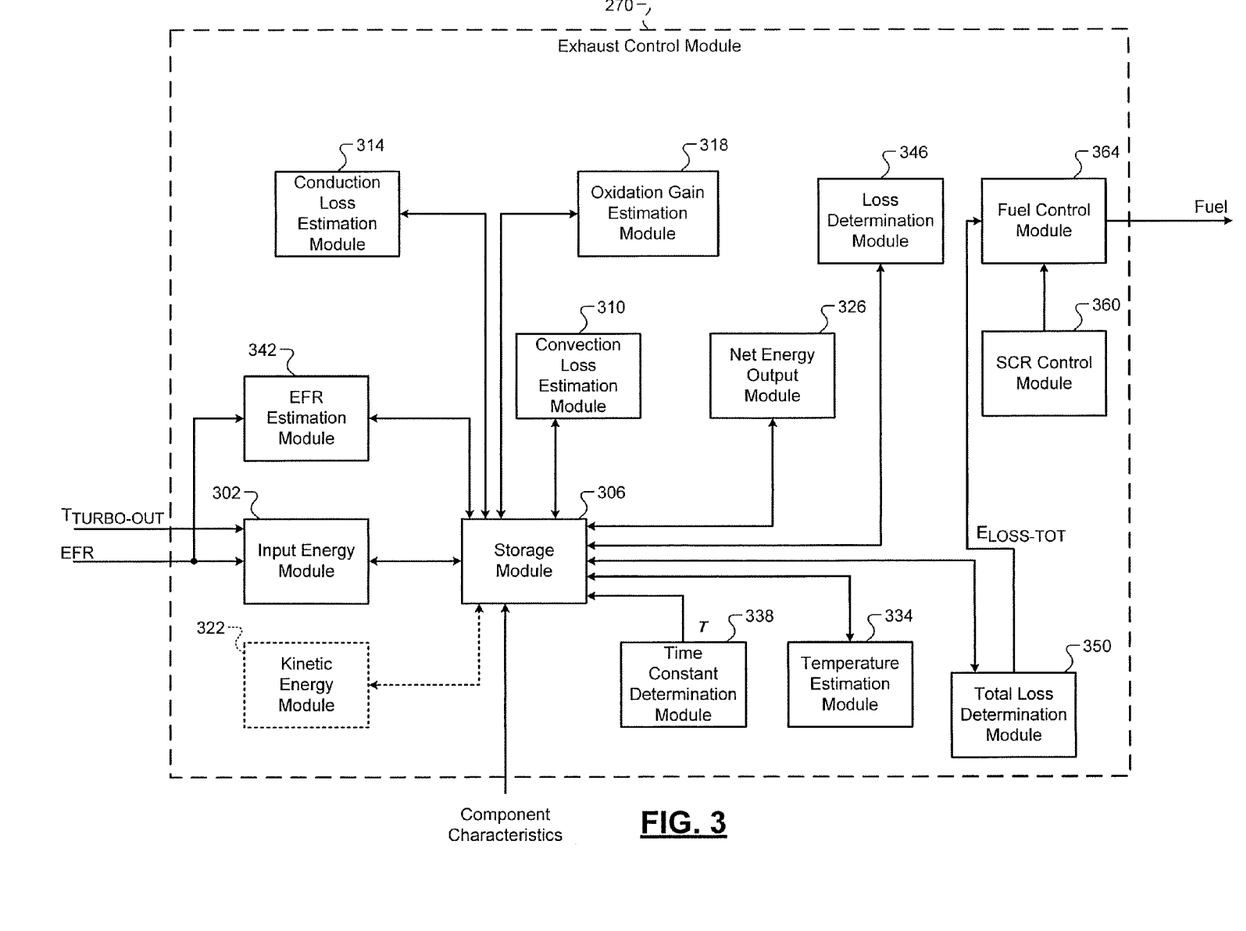
FIG. 3 is a functional block diagram of an exemplary exhaust control module according to the principles of the present disclosure.

Referring now to FIG. 3, a functional block diagram of an exemplary implementation of the exhaust control module 270 is presented. The exhaust control module 270 may include an input energy module 302, a storage module 306, a convection loss estimation module 310, a conduction loss estimation module 314, and an oxidation gain estimation module 318. The exhaust control module 270 may also include a kinetic energy module 322, a net energy determination module net energy output module 326, a temperature estimation module 334, a time constant determination module 338, and an EFR estimation module 342. The exhaust control module 270 may also include a loss determination module 346 and a total loss determination module 350.

The input energy module 302 estimates a rate of energy input to the first exhaust pipe 220 and may estimate a rate of energy input to each of the components implemented downstream of the first exhaust pipe 220. The first exhaust pipe 220 and the components implemented downstream of the first exhaust pipe 220 will be collectively referred to hereafter as components 220-240.

The input energy module 302 may determine the input energy rate of a given one of the components 220-240 based on a temperature of the exhaust input to the component, the EFR into the component, and a specific heat of the exhaust input to the component. For example only, the input energy module 302 may determine the input energy rate (e.g., J/s) of a given one of the components 220-240 using the equation:

$$E_{IN} = \frac{T_G}{C_G * EFR}, \quad (1)$$

where $E_{IN}$ is the rate of energy input to the component, $T_G$ is the temperature of the exhaust input to the component, $C_G$ is the specific heat of the exhaust input to the component, and EFR is the mass flow rate of the exhaust input to the component. For the first exhaust pipe 220, $T_G$ may be the turbo outlet temperature and EFR may be the EFR measured by the EFR sensor 284. The input energy module 302 may store the input energy rates by component within the storage module 306.

The specific heats of the exhaust input to each of the components 220-240 may be determined by the convection loss estimation module 310. A more detailed discussion of the determination of the specific heats can be found below in conjunction with the exemplary embodiments of FIG. 4 and FIG. 5. In sum, the specific heats are corrected based on an oxygen concentration of the exhaust.

Each of the components 220-240 may be categorized into one of three groups. For example only, each of the components 220-240 may characterized as a pipe, a brick, or a conical frustum. The first, second, and third exhaust pipes 220, 228, and 240 may be categorized as pipes. The first, second, third, and fourth conical frustums 220, 226, 230, and 238 may be categorized as conical frustums. The DOC 224, the SCR catalyst 234, and the DPF 236 may be categorized as bricks. As the DOC 224, the SCR catalyst 234, and the DPF 236 are contained within housings, the DOC 224, the SCR catalyst 234, and the DPF 236 may also be said to include both a brick and a pipe.

The convection loss estimation module 310 may determine a specific heat of the exhaust for each of the components 220-240. The convection loss estimation module 310 may determine the specific heat of the exhaust within a given one of the components 220-240 based on a temperature of exhaust input to the component.

For the first exhaust pipe 220, for example, the convection loss estimation module 310 may determine the specific heat of the exhaust based on the turbo outlet temperature. The temperature of the exhaust input to a component implemented downstream of the first exhaust pipe 220 may be equal to a temperature of exhaust output from another component implemented directly upstream of the component. For example only, the temperature of exhaust input to the second exhaust pipe 228 may be equal to the temperature of exhaust output from the second conical frustum 226. The estimation of the temperature output from the components is discussed in detail below. The convection loss estimation module 310 may store the specific heats by component within the storage module 306.

The convection loss estimation module 310 may estimate an energy loss rate attributable to convection for each of the components 220-240. While the energy loss rate attributable to convection is discussed as referring to as a loss, the convective energy loss rate may be an energy gain rate in some circumstances. For example only, the convection loss estimation module 310 may estimate a convective energy loss rate (e.g., J/s) of a given one of the components 220-240, for example, using the equation:

$$E_{CV} = (T_S - T_G) * A * h_{CV}, \quad (2)$$

where $E_{CV}$ is the convective energy loss rate, $T_S$ is a temperature of a surface area of the component where convection between the exhaust and the component occurs, $T_G$ is the temperature of the exhaust input to the component, A is the surface area of the component where the convection occurs, and $h_{CV}$ is a predetermined convection coefficient.

For a given brick, the convection loss estimation module 310 may estimate one convective energy loss rate between the exhaust and the brick and one convective energy loss rate between the exhaust and the housing. For example only, the convection loss estimation module 310 may determine the convective energy loss rate for a brick based on a sum of the two convective energy loss rates.

The convection loss estimation module 310 may estimate the temperature of the surface area of the given component (i.e., $T_S$), for example, based on an integral of:

$$\frac{E_{CV-L}}{V * D * C_C}, \quad (3)$$

where $E_{CV-L}$ is the convective energy loss of the component during a last control loop, V is a volume of the component, D is the density of the component, and $C_C$ is a predetermined specific heat of the component. The convection loss estimation module 310 may also limit the temperature of the surface area to between a predetermined minimum temperature (e.g., 0 K) and a predetermined maximum temperature (e.g., 1500 K), inclusive.

The convection loss estimation module 310 may use equations (2) and (3) in estimating the convective loss rate of a given pipe, a given cone, and the housing of a given brick. For estimating a convection loss rate of a given brick, however, the convection loss estimation module 310 may estimate the temperature of the surface area of the given brick, for example, based on a result of an integral of:

$$\frac{E_{CV-L}}{m * C_C}, \quad (4)$$

where m is the mass of the brick and $C_C$ is the predetermined specific heat of the brick.

Characteristics of each of the components 220-240 may be stored within the storage module 306 and may be retrieved from the storage module 306 when needed. For example only, the surface area of each of the components 220-240, the predetermined convection coefficient for each of the components 220-240, the volume of each of the components 220-240, the specific heat of each of the components 220-240, and other suitable characteristics that are not shown may be stored by component within the storage module 306. The characteristics of each of the components 220-240 may be stored, for example, before a vehicle leaves an assembly location.

The convection loss estimation module 310 and/or other modules may retrieve component characteristics from the storage module 306 when needed. The convection loss estimation module 310 may store the convection energy loss rates by component within the storage module 306.

The conduction loss estimation module 314 may estimate an energy loss rate attributable to conduction for each of the components 220-240. For example only, the conduction loss estimation module 314 may estimate a conductive energy loss rate (e.g., J/s) for a given one of the components 220-240 using the equation:

$$E_{CD} = -k * A * \frac{\Delta T}{x}, \quad (5)$$

where $E_{CD}$ is the conductive energy loss rate of the component, k is a predetermined conductive coefficient of the component, A is a surface area of the given component between two heat fields, $\Delta T$ is a temperature difference between the temperature of the exhaust input to the component and an environmental temperature, and x is a thickness of the component between the two heat fields. The environmental temperature is discussed in more detail below.

For a given brick, the conductive loss estimation module 314 may estimate one conductive energy loss rate between the brick and the housing and one conductive energy loss rate between the housing and the environment. For example only, the conductive loss estimation module 314 may determine the conductive energy loss rate for a brick based on a sum of the two conductive energy loss rates.

The conduction loss estimation module 314 may determine the environmental temperature by adjusting ambient temperature based on the vehicle speed. More specifically, the conductive loss estimation module 314 may determine a temperature correction based on the vehicle speed and adjust the ambient temperature based on the temperature correction to determine the environmental temperature. The conduction loss estimation module 314 may store the conduction energy loss rates by component within the storage module 306.

Energy may be gained within one or more of the components 220-240 via HC oxidation. The HC that may be oxidized within a given component may result from combustion within the engine 102, may be provided by the fuel actuator module 250, may be slipped from an upstream component, may have desorbed from an upstream component, and/or from other suitable sources.

The oxidation gain estimation module 318 may estimate an oxidation energy gain rate for each of the components 220-240. For example only, the oxidation gain estimation module 318 may estimate an oxidation energy gain rate (e.g., J/s) of a given one of the components 220-240 based on a conversion energy gain rate and a phase change energy loss rate.

The given component may gain oxidation energy via conversion (e.g., oxidation) of HC. The rate of energy gained through HC conversion may be referred to as the conversion energy gain rate. The given component may lose oxidation energy via changing the phase of fuel from a liquid into a gas (i.e., vaporizing the fuel). The rate of energy lost to changing the phase of fuel may be referred to as the phase change energy loss rate. The oxidation gain estimation module 318 may estimate the oxidation energy gain rate of a given one of the components 220-240 based on a sum of the conversion energy gain rate and the phase change energy loss rate.

The oxidation gain estimation module 318 may also determine a fuel slip rate and an unvaporized HC output rate for each of the components 220-240. The oxidation gain estimation module 318 may store the oxidation energy gain rates by component within the storage module 306. The oxidation gain estimation module 318 may also store the fuel slip rates and/or the unvaporized HC output rates by component within the storage module 306.

The exhaust may gain or lose kinetic energy within some components, such as within the first, second, third, and fourth conical frustums 222, 226, 230, and 238. A kinetic energy gain may be attributable to, for example, a reduction in opening area in the direction of the exhaust flow (and therefore a pressure increase). A kinetic energy loss may be attributable to an increase in opening area in the direction of the exhaust flow (and therefore a pressure decrease). For example only, the exhaust may lose kinetic energy within the first and third conical frustums 222 and 230, and the exhaust may gain kinetic energy within the second and fourth conical frustums 226 and 238.

The kinetic energy module 322 may determine an outlet temperature for each of the conical frustums. The kinetic energy module 322 may determine an enthalpy of the exhaust flowing into a given conical frustum based on the temperature of the exhaust flowing into the conical frustum. The kinetic energy module 322 may also determine an enthalpy change based on a volumetric flowrate of the exhaust entering the conical frustum and the change in the opening area of the conical frustum. The kinetic energy module 322 may adjust the enthalpy based on the enthalpy change and may convert the adjusted enthalpy into the outlet temperature. The outlet temperature may be used by the temperature estimation module 334, for example, in estimating or adjusting the outlet temperature of the conical frustums.

In some implementations, the kinetic energy gains or losses of the conical frustums may be negligible. Accordingly, the kinetic energy module 322 may be omitted in some implementations in the interest of memory allocation and conservation of computational efficiency.

The net energy output module 326 may determine a net rate energy output from each of the components 220-240 via the exhaust. The net energy output module 326 may determine a net energy rate (e.g., J/s) output from a given one of the components 220-240 based on the rate of energy input to the component, the convective energy loss rate of the component, the conductive energy loss rate of the component, and the oxidation energy gain rate of the component. For example only, the net energy output module 326 may determine the net energy output rate of the component using the equation:

$$E_{NET} = E_{IN} + E_O + E_{CV} + E_{CD}, \quad (6)$$

where $E_{NET}$ is the net energy rate output from the component, $E_{IN}$ is the rate of energy input to the component (positive), $E_O$ is the oxidation energy gain rate within the component (positive or zero), $E_{CV}$ is the convective energy loss rate of the component (positive or negative), and $E_{CD}$ is the conductive energy loss rate of the component (generally negative).

The net energy output module 326 may store the net rates of energy output by component within the storage module 306. The net energy output rate from one of the components 220-240 (i.e., the $E_{NET}$) may be used as the rate of energy input to a next one of the components 220-240 (i.e., the $E_{IN}$).

Based on the energy gains and losses upstream of a desired location between an inlet and an outlet of a component, the net energy output module 326 may determine the net energy rate at the desired location. For example only, the net energy output module 326 may determine the net energy rate at the desired location using equation (6), where $E_{IN}$ is the input energy rate to the first exhaust pipe 220, $E_O$ is a total of the oxidation energy gain rates upstream of the desired location, $E_{CV}$ is a total of the convection energy loss rates upstream of the desired location, and $E_{CD}$ is a total of the conductive energy loss rates upstream of the desired location. For another example only, the net energy output module 326 may determine the net energy rate at the desired location using equation (6), where $E_{IN}$ is the input energy rate of the component, $E_O$ is an oxidation energy gain rate between the inlet of the component and the desired location, $E_{CV}$ is a convective energy loss rate between the inlet of the component and the desired location, and $E_{CD}$ is a conductive energy loss rate between the inlet of the component and the desired location. When the desired location is between the inlet and outlet of a component, the characteristics of the component upstream of the desired location, an average, or another suitable measure may be used.

The temperature estimation module 334 estimates a temperature of the exhaust at a location based on the net energy rate at the location. The temperature estimation module 334 may estimate the temperature of the exhaust output from a given one of the components 220-240 based on the net energy rate output from the component. The temperature estimation module 334 may estimate the temperature of the exhaust at a desired location between an inlet and an outlet of a component based on the net energy rate at the desired location. For example only, the temperature estimation module 334 may estimate the temperature of the exhaust at a given location ($T_{G-OUT}$) of a component by integrating:

$$\frac{E_{NET}}{C_G * EFR}, \quad (7)$$

with respect to time and adjusting for a time constant of the component, where $E_{NET}$ is the net energy rate at the location, $C_G$ is the specific heat of the exhaust input to the component, and EFR is the EFR of the exhaust input to the component.

The EFR estimation module 342 may estimate the EFR at the location based on the EFR provided by the EFR sensor 284 and the characteristics of the components 220-240 implemented upstream of the component. The EFR estimation module 342 may store the EFRs by component within the storage module 306.

The time constant determination module 338 may determine the time constant. The time constant determination module 338 may determine the time constant for each of the components 220-240 and may store the time constants within the storage module 306 by component for use by the temperature estimation module 334. For example only, the time constant determination module 338 may determine the time constant for a given one of the components 220-240 using the equation:

$$T = \frac{D * V * C_C}{h_{CV} * A}, \quad (8)$$

where T is the time constant, D is the density of the component, V is the volume of the component, $C_C$ is the predetermined specific heat of the component, $h_{CV}$ is the predetermined convection coefficient, and A is the surface area of the component.

For a given brick, such as the DOC 224, the SCR catalyst 234, or the DPF 236, the temperature estimation module 334 may additionally or alternatively estimate a temperature of the exhaust at a location within the brick. For example only, the estimate the temperature of the exhaust within a given brick using the equation:

$$T_{G-B} = \frac{E_{IN} + E_O}{2 * C_G * EFR}, \qquad (9)$$

where $T_{G-B}$ is the temperature of the exhaust within the brick, $E_{IN}$ is the rate of energy input to the brick, $E_O$ is the oxidation energy gain of the brick, $C_G$ is the specific heat of the exhaust input to the brick, and EFR is the EFR into the brick.

The temperature of the exhaust within a given brick may be used to determine the conversion efficiency of the brick, and the conversion efficiency may be used in controlling one or more associated parameters. For example only, the HC conversion efficiency may be used in controlling the rate of fuel injection by the fuel actuator module 250. The NOx conversion efficiency may be used in controlling the rate of injection of the dosing agent.

The loss determination module 346 determines an energy loss rate associated with each of the components 220-240. For example only, the loss determination module 346 may determine an energy loss rate (e.g., J/s) of a given one of the components 220-240 based on the convective energy loss rate of the component, the conductive energy loss rate of the component, and the oxidation energy gain rate of the component. For example only, the loss determination module 346 may determine the energy loss rate of a given one of the components 220-240 using the equation:

$$E_{LOSS} = E_O + E_{CV} + E_{CD}, \qquad (10)$$

where $E_{LOSS}$ is the energy loss rate of the component, $E_O$ is the oxidation energy gain rate within the component (positive or zero), $E_{CV}$ is the convective energy loss rate of the component (positive or negative), and $E_{CD}$ is the conductive energy loss rate of the component (generally negative). The loss determination module 346 may store the energy loss rates by component within the storage module 306.

The total loss determination module 350 determines a total energy loss rate upstream of a desired location based on the energy loss rates upstream of the desired location. For example only, the total loss determination module 350 may determine a total energy loss rate (e.g., J/s) at the desired location based on a sum of the energy loss rates upstream of the desired location.

The desired location may be, for example, an inlet of the DPF 236. The total loss determination module 350 may determine the total energy loss rate upstream of the inlet of the DPF 236 based on a sum of the energy loss rates of the first exhaust pipe 220, the first conical frustum 222, the DOC 224, the second conical frustum 226, the second exhaust pipe 228, the third conical frustum 230, and the SCR catalyst 234.

The exhaust control module 270 may also include an SCR control module 360 and a fuel control module 364. The SCR control module 360 may control one or more exhaust system parameters. For example only, the SCR control module 360 may control the injection rate of the dosing agent. The SCR control module 360 may control the injection rate of the dosing agent to, for example, maximize the amount of NOx removed from the exhaust (i.e., the conversion efficiency) and to minimize (or prevent) ammonia slip. Ammonia slip may refer to an amount of ammonia present downstream of the SCR catalyst 234.

The SCR control module 360 may also generate selectively requests for the fuel control module 364. For example only, the SCR control module 360 may request an increase or a decrease in the rate of injection of fuel by the fuel actuator module 250. The SCR control module 360 may request an increase or a decrease in the fuel injection rate to, for example, control a temperature of the SCR catalyst 234.

The fuel control module 364 may control the mass flowrate of fuel injected by the fuel actuator module 250 (e.g., g/s). For example only, the fuel control module 364 may control the fuel injection rate to adjust a temperature of the exhaust or a component to a target temperature. For example only, the fuel control module 364 may control the fuel injection rate to achieve a target DPF temperature for a regeneration event of the DPF 236.

The fuel control module 364 may determine when to regenerate the DPF 236 based on a mass of particulate trapped within the DPF 236 and/or other suitable parameters. The mass of the particulate trapped within the DPF 236 may be referred to as loading of the DPF 236. The loading of the DPF 236 may be determined based on the EFR, a pressure drop across the DPF 236, and/or other suitable parameters. The fuel control module 364 may initiate and perform regeneration of the DPF 236 when the loading is greater than a predetermined loading and/or when other suitable conditions are satisfied.

The fuel control module 364 may determine or receive the target temperature. For example only, the fuel control module 364 may receive a target temperature for a regeneration event of the DPF 236. The fuel control module 364 determines a temperature difference between the turbo outlet temperature measured by the turbo outlet temperature sensor 280 and the target temperature. The fuel control module 364 estimates a target input energy rate based on the temperature difference, the total energy loss rate upstream of the location, the specific heat of the exhaust at the location, and the EFR.

The fuel control module 364 controls the rate of fuel injection by the fuel actuator module 250 based on the target energy input rate. In this manner, the fuel control module 364 controls the fuel injection rate of the fuel actuator module 250 to achieve the target temperature at the location. For example only, the fuel control module 364 may control the fueling rate to achieve a DPF input temperature that is suitable for regeneration of the DPF 236.

The fuel control module 364 controls the fueling rate in an open-loop. Open-loop control may refer to control of a parameter without receiving feedback from a sensor measuring the parameter. For example only, open-loop control of the DPF input temperature may refer to control of the DPF input temperature without receiving feedback from a DPF input temperature sensor.

Figure 4:
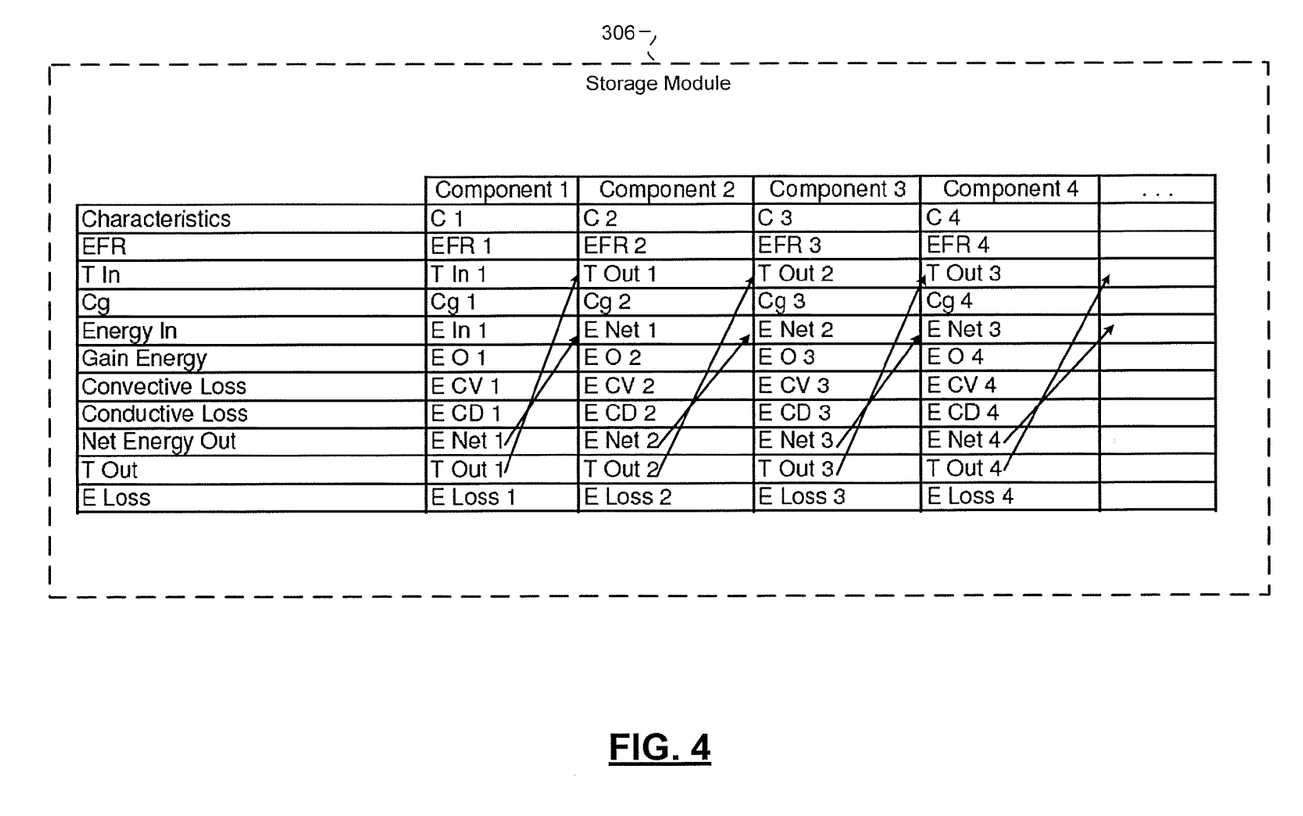
FIG. 4 is a functional block diagram of an exemplary storage module according to the principles of the present disclosure.

Referring now to FIG. 4, an exemplary diagram of an arrangement of data that may be stored within the storage module 306 is presented. The storage module 306 may include an index of the components 220-240 and the parameters associated with the components 220-240, respectively. For example only, characteristics, an EFR, an input temperature of the exhaust, a specific heat of the exhaust, an input energy rate, a oxidation energy gain rate, a convective energy loss rate, a conductive energy loss rate, a net output energy rate, and an outlet temperature of the exhaust may be stored for each of the components 220-240. Other parameters may also be stored in the storage module 306 for each of the components 220-240.

The exhaust temperature and energy rate input to a first component may be equal to the exhaust temperature and the net rate of energy output, respectively, from a second component implemented directly upstream of and providing exhaust to the first component. Written conversely, the net rate of energy output and the exhaust temperature of the second component may be used as the input energy rate and exhaust temperature, respectively, of the first component, where the first component is implemented directly downstream of the second component. Arrows have been included in FIG. 4 to illustrate this point.

Figure 5:
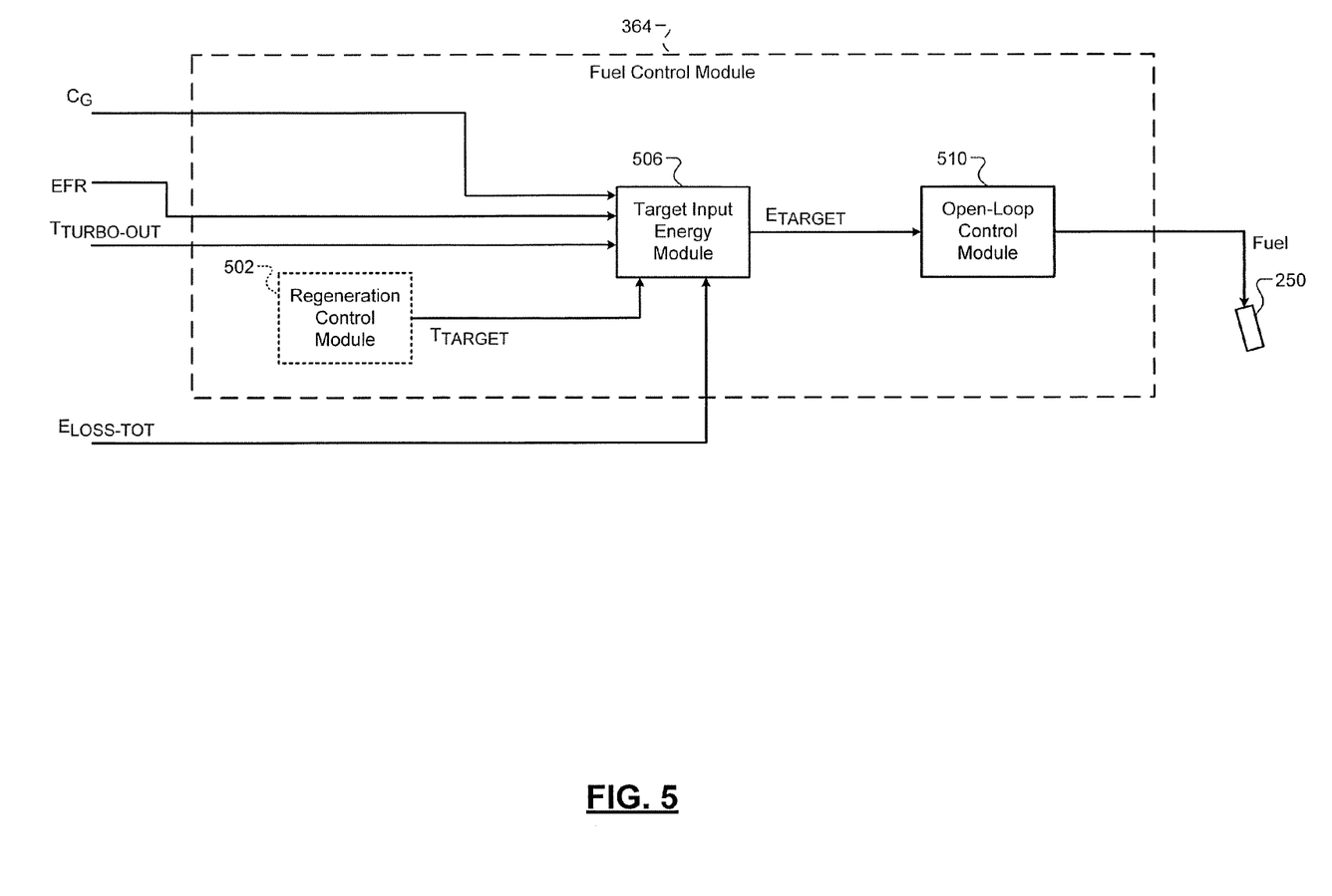
FIG. 5 is a functional block diagram of an exemplary fuel control module according to the principles of the present disclosure.

Referring now to FIG. 5, a functional block diagram of an exemplary implementation of the fuel control module 364 is presented. The fuel control module 364 may include a regeneration control module 502, a target energy input module 506, and an open-loop control module 510.

The target energy input module 506 receives a target temperature for a location. For example only, the target temperature may be a target temperature for the exhaust input to the DPF 236 or within the DPF 236. While the target temperature may be discussed as it relates to the target temperature associated with the DPF 236, the present application is applicable to other target temperatures at other locations. For example only, the target temperature may be a target temperature for exhaust input to the SCR catalyst 234 or at another suitable location.

The regeneration control module 502 may selectively determine the target temperature for the DPF 236. The target DPF temperature may be a target temperature for the exhaust input to the DPF 236, for example, for a regeneration event of the DPF 236. For example only, the target temperature may be approximately 600-800° C. for a regeneration event.

The target energy input module 506 determines a target input energy rate for adjusting the exhaust temperature at the location toward the target temperature. The target energy input module 506 may determine the target input energy rate based on the target temperature, the temperature of the exhaust input to the first exhaust pipe 220, the total energy loss rate upstream of the location, the EFR, and the specific heat of the exhaust at the location. For example only, the target energy input module 506 may determine the target input energy rate (e.g., J/s) using the equation:

$$E_{TARGET} = C_G * EFR * (T_{TARGET} - T_G) - E_{LOSS-TOT},\quad(11)$$

where $E_{TARGET}$ is the target input energy rate, $C_G$ is the specific heat of the exhaust input to the component, $T_{TARGET}$ is the target temperature, $T_G$ is the temperature of the exhaust input to the first exhaust pipe 220, and $E_{LOSS-TOT}$ is the total energy loss rate upstream of the location. For example only, the $T_G$ may be the turbo outlet temperature.

The open-loop control module 510 controls the fuel injection rate of the fuel actuator module 250 based on the target input energy rate. More specifically, the open-loop control module 510 may determine a target-open loop fueling rate based on the target input energy rate and an energy content of the fuel injected by the fuel actuator module 250. The energy content of the fuel may include, for example, a lower heating value (LHV) of the fuel (e.g., J/g) or another suitable parameter indicative of the energy content of the fuel. For example only, the open-loop control module 510 may determine the target-open loop fueling rate (e.g., g/s) based on a quotient of the target input energy rate and the LHV of the fuel.

The open-loop control module 510 controls the fuel injection rate of the fuel actuator module 250 based on the target-open loop fueling rate. In this manner, the fuel actuator module 250 supplies fuel to the DOC 224 at the target-open loop fueling rate to adjust the exhaust temperature at the location toward the desired temperature without feedback from a sensor measuring the temperature at the location.

Figure 6:
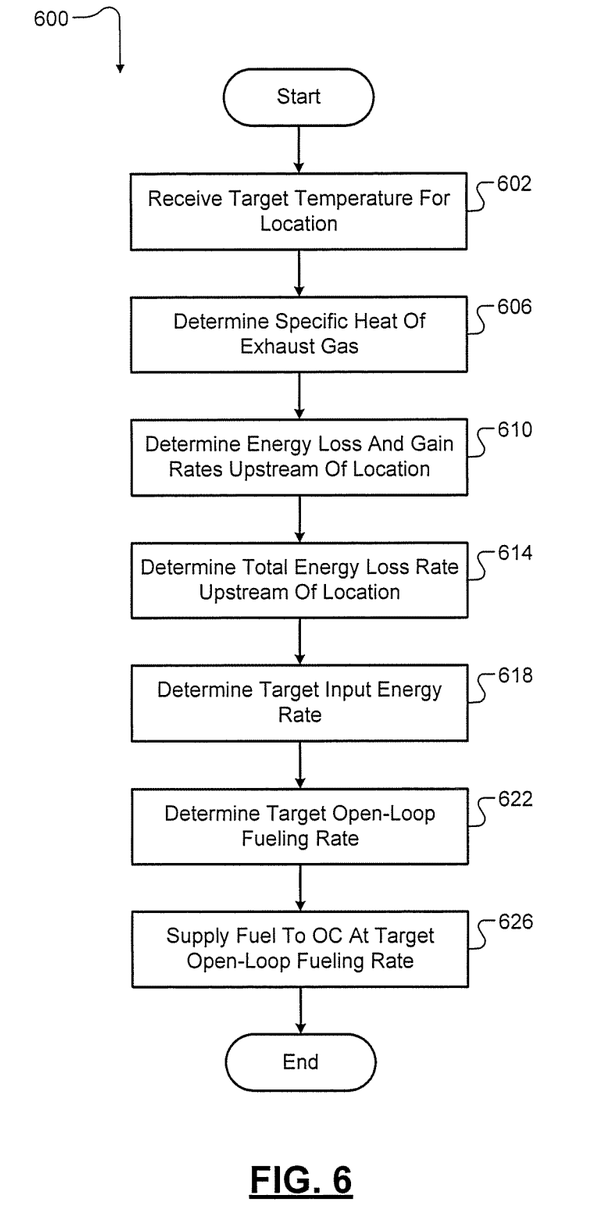
FIG. 6 is a flowchart depicting exemplary steps that may be performed by a method according to the principles of the present disclosure.

Referring now to FIG. 6, a flowchart depicting exemplary steps 600 that may be performed by a method is presented. Control may begin in step 602 where control may receive a target temperature for the exhaust at a location. For example only, control may receive a target temperature for the exhaust input to the DPF 236 or within the DPF 236.

Control may determine a specific heat of the exhaust in step 606. Control may determine the specific heat based on a nominal specific heat of the exhaust and a correction for the nominal specific heat. The correction may be determined based on an oxygen concentration of the exhaust measured by a sensor.

In step 610, control may determine the energy loss and gain rates upstream of the location. For example only, control may determine a convective energy loss rate, a conductive energy loss rate, and an oxidation energy gain rate for each of the components 220-240 implemented upstream of the location. Control may determine a total energy loss rate upstream of the location in step 614. Control may determine the total energy loss rate based on a sum of the energy loss and gain rates of each of the components 220-240 implemented upstream of the location.

Control may determine a target input energy rate in step 618. Control may determine the target input energy rate based on the temperature of the exhaust input to the component, the target temperature, the specific heat of the exhaust, the EFR, and the total energy loss rate. For example only, control may determine the target input energy rate using equation (11), as discussed above.

Control may determine a target open-loop fueling rate in step 622. For example only, control may determine the target open-loop fueling rate based on a quotient of the target input energy rate and the lower heating value of the fuel. Control supplies fuel to the DOC 224 at the target open-loop fueling rate in step 626, and control may end.

The DOC 224 oxidizes HC provided by the fuel, and the oxidation generates heat. The heat is directed downstream by the flow of the gas. The heat may adjust the exhaust temperature at the location toward the target temperature. While control is shown as ending after step 626, control may instead return to step 602. In other words, the exemplary steps 600 may be illustrative of one control loop, and more than one control loop may be performed.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust control system comprising:
   a total loss determination module that determines a total energy loss rate of exhaust upstream of a location in an exhaust system based on a convective energy loss rate upstream of the location, a conductive energy loss rate upstream of the location, and an oxidation energy gain rate upstream of the location; and
   a fuel control module that receives a target temperature for the exhaust at the location, that determines a target input energy rate based on the target temperature, a temperature of exhaust input to the exhaust system, and the total energy loss rate, and that controls a rate of fuel injection into the exhaust system upstream of an oxidation catalyst based on the target input energy rate.

2. The exhaust control system of claim 1 wherein the fuel control module controls the rate of fuel injection further based on a lower heating value of the fuel.

3. The exhaust control system of claim 2 wherein the fuel control module controls the rate of fuel injection based on a quotient of the target input energy rate and the lower heating value.

4. The exhaust control system of claim 1 wherein the fuel control module determines the target input energy rate further based on a specific heat of the exhaust input to a component and an exhaust flow rate.

5. The exhaust control system of claim 4 wherein the fuel control module determines the target input energy rate based on a first difference between the total energy loss rate and an energy rate that is a product of the specific heat, the exhaust flow rate, and a second difference between the target temperature and the temperature of the exhaust input to the exhaust system.

6. The exhaust control system of claim 1 wherein the location is an input to a diesel particulate filter.

7. The exhaust control system of claim 1 wherein the location is an input to a selective catalytic reduction catalyst.

8. The exhaust control system of claim 1 wherein the location is between an inlet and an outlet of a particulate filter.

9. The exhaust control system of claim 1 wherein the specific heat is determined based on a nominal specific heat of the exhaust at the location and a correction for a measured oxygen concentration of the exhaust.

10. The exhaust control system of claim 1 wherein the temperature of the exhaust input to the exhaust system is a temperature at an outlet of a turbocharger impeller.

11. An exhaust control method comprising:
determining a total energy loss rate of exhaust upstream of a location in an exhaust system based on a convective energy loss rate upstream of the location, a conductive energy loss rate upstream of the location, and an oxidation energy gain rate upstream of the location;
receiving a target temperature for the exhaust at the location;
determining a target input energy rate based on the target temperature, a temperature of exhaust input to the exhaust system, and the total energy loss rate; and
controlling a rate of fuel injection into the exhaust system upstream of an oxidation catalyst based on the target input energy rate.

12. The exhaust control method of claim 11 further comprising controlling the rate of fuel injection further based on a lower heating value of the fuel.

13. The exhaust control method of claim 12 further comprising controlling the rate of fuel injection based on a quotient of the target input energy rate and the lower heating value.

14. The exhaust control method of claim 11 further comprising determining the target input energy rate further based on a specific heat of the exhaust input to a component and an exhaust flow rate.

15. The exhaust control method of claim 14 further comprising determining the target input energy rate based on a first difference between the total energy loss rate and an energy rate that is a product of the specific heat, the exhaust flow rate, and a second difference between the target temperature and the temperature of the exhaust input to the exhaust system.

16. The exhaust control method of claim 11 wherein the location is an input to a diesel particulate filter.

17. The exhaust control method of claim 11 wherein the location is an input to a selective catalytic reduction catalyst.

18. The exhaust control method of claim 11 wherein the location is between an inlet and an outlet of a particulate filter.

19. The exhaust control method of claim 11 further comprising determining the specific heat based on a nominal specific heat of the exhaust at the location and a correction for a measured oxygen concentration of the exhaust.

20. The exhaust control method of claim 11 wherein the temperature of the exhaust input to the exhaust system is a temperature at an outlet of a turbocharger impeller.

* * * * *